Dec. 17, 1968    D. D. SPILKER    3,416,235
GUIDE STRIP FOR STRIPING TOOLS
Filed Feb. 1, 1967
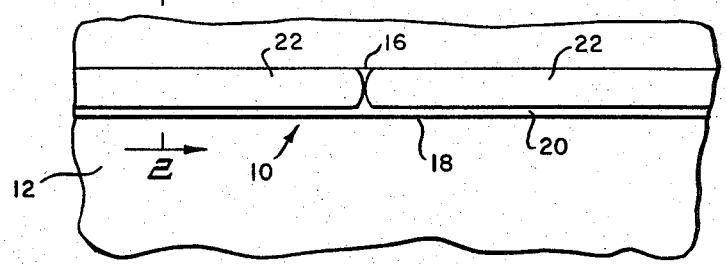
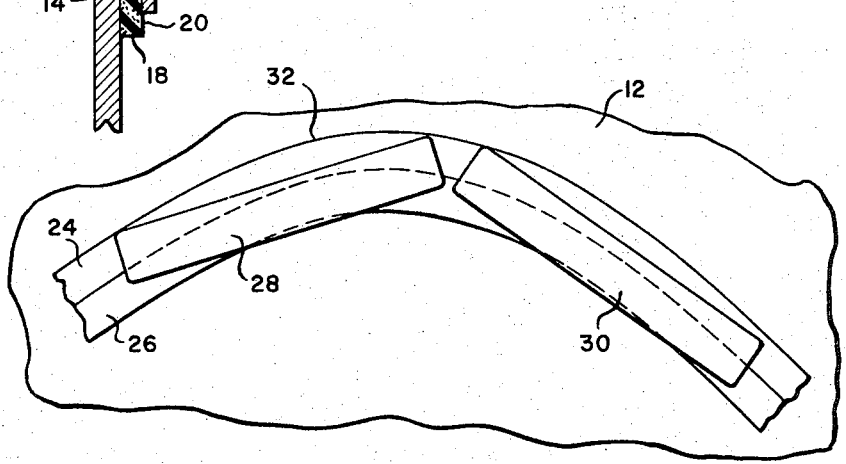
INVENTOR
DONALD D. SPILKER
BY
*Scrivener Parker Scrivener & Clarke*
ATTORNEYS United States Patent Office 3,416,235
Patented Dec. 17, 1968

3,416,235
GUIDE STRIP FOR STRIPING TOOLS
Donald D. Spilker, P.O. Box 684,
Lima, Ohio 45802
Filed Feb. 1, 1967, Ser. No. 613,302
1 Claim. (Cl. 33—177)

ABSTRACT OF THE DISCLOSURE

Means are provided by the present invention for facilitating the application of painted stripes on surfaces, specifically the body surfaces of automobiles. Magnetized plastic strips are used as the guide for the striping tool with metallic strips applied to the surface of the strips to increase the holding power of the strips.

---

This invention relates to a guide strip for facilitating the application of painted stripes to a metallic surface, and more particularly to guide strips which may be readily applied to such surfaces for efficiently guiding applicator for producing straight or curved stripes.

The important feature of the invention resides in the provision of at least one elongated plastic strip having a plurality of magnetized particles embedded therein, the strip being magnetically adhered to a metallic surface and having a straight edge for guiding the striping tool for producing straight stripes and the strip being flexible and thus capable of assuming an arcuate shape for producing curved stripes. After application of the strip to the surface, a relative thin steel strip may be applied to the exposed surface of the plastic strip in order to increase the magnetic attraction between the latter and the surface to be striped. In addition to the foregoing, when a strip is employed for making curved stripes, a plurality of adjacent and relatively narrow plastic strips may be used and in such case, the plurality of strips mutually augment the magnetic attraction of each. Further increase in the magnetic attraction may be achieved by applying relatively thin steel strips over the plastic strips.

In accordance with the foregoing, an important object of the present invention is to provide a flexible plastic strip having magnetic properties and being adapted to be magnetically adhered to a metallic surface, such as a car body or the like, in order to provide a suitable guide for a stripping tool during the application of painted stripes to such surface.

A further object is to provide a magnetic plastic strip of the above character which is sufficiently flexible as to be magnetically applied to flat as well as curved metallic surfaces.

Still another object resides in the provision of relatively thin metallic strips to the plastic strip, after application of the latter to the metallic surface, the use of such metallic strips materially increasing the magnetic attraction between the plastic strip and the surface.

A still further object is to provide an arrangement for the application of curved stripes to the metallic surface, such being achieved by employing a plurality of relatively narrow, magnetic plastic strips which are arranged side by side and which are bent or curved to provide the desired arcuate shape.

Another object is to provide in the foregoing curved arrangement, a novel construction for further increasing the magnetic attraction between the plastic strips and the metallic surface in order to prevent any variation of the curved contour of the plastic strips after initial adjustment thereof has been effected.

Other objects and novel features of the invention will appear more fully hereinafter from a consideration of the following description when taken in connection with the accompanying drawing which is illustrative of the invention. It is to be expressly understood however, that the drawing is utilized for purposes of illustration only and is not to be taken as a definition of the limits of the invention, reference being had for this purpose to the appended claim.

Referring to the drawing, wherein similar reference characters refer to similar parts throughout the several views:

FIG. 1 is a partial plan view of a metallic surface to which the novel guide strip of the present invention is magnetically applied;

FIG. 2 is an enlarged sectional view taken substantially along line 2—2 of FIG. 1, and FIG. 3 is a partial plan view of the invention when arranged in a manner to providing a curved guide strip for the application of curved stripes.

Referring more particularly to FIG. 1, the present invention is shown therein as including a flexible guide strip 10 which is applied to and is magnetically adhered to a metallic surface 12, such as a car body, in order to provide a guide for a painting tool when painting stripes on said surface. As shown, the guide strip 10 is of rectangular cross section having a side 14 contacting the surface 12, upper and lower edges 16 and 18 and an exposed surface 20, the strip 10 being arranged in FIG. 1 for painting a straight stripe or stripes with the upper edge 16 constituting a guide for the painting tool.

The guide strip 10 is formed of a suitable magnetic strip material which may be of the type known in the trade as Plastiform, manufactured by the Leyman Corporation, Cincinnati, Ohio, and comprises a body of flexible plastic material in which finely divided particles of permanently magnetized material are embedded in a substantially uniform manner. Due to the magnetic properties of the material, it will readily adhere to the metallic surface 12 and in view of the flexible nature of the material, the strip readily assumes the contour of the surface, such as a car body which presents flat as well as rounded portions. The strip material is of sufficient thickness as to provide an edge portion for securing a solid guide for the painting tool and possesses sufficient magnetic attraction that it will not slip during the stripping operation. It has been found that material of the above type having a width of ½ inch and a thickness of 3/16 inch is highly satisfactory. The length of the strips may vary in accordance with the nature of the stripe desired, it being noted that for long stripes, a plurality of strips may be aligned in end-abutting relationship.

In order to increase the magnetic attraction between the strip 10 and the car body 12, a plurality of flexible steel strips 22 are applied to the exposed surface 20 of the strip 10 to provide the completion of a large number of magnetic loops. In this manner the overall magnetic attraction between the strip 10 and the car body 12 is materially strengthened and an unusually rigid guide edge 16 is secured for the striping tool. Excellent results have been obtained using steel strips having a size of .020 inch x .5 inch x 5 feet, it being understood that for long spans, two or more of the flexible steel strips 22 may be placed in edge-abutting relationship as shown in FIG. 1. While the width of the strips 22 has been shown in FIG. 1 to be slightly less than the width of the flexible, magnetic strip material 10, it will be understood that in practice, the widths may be equal. Furthermore, the upper edge of the steel strip 22 may be aligned with the upper edge 16 of the flexible, magnetic strip 10 in order to strengthen the guide edge which engages the striping tool.

FIG. 3 shows an arrangement of the invention for guiding the striping tool around small or relatively sharp curves. As shown in this figure it is preferred to utilize a pair of flexible, magnetic strips 24, 26 in edge-abutting relationship and in order to secure a curved contour for securing curves of small arc, the strips 24, 26 in FIG. 3 are of less width than the strip 10 of FIG. 1, for example being of a width of ¼ inch or less. Since the strips 24, 26 are in edge-abutting relationship and parallel with each other, they tend to reinforce the magnetic attraction between the strips and the metallic surface to which they are applied. The magnetic attraction between the strips and the surface may be further increased by applying a plurality of flexible thin steel strips 28 and 30 to the exposed surfaces of the magnetic strips 24, 26, the strengthening of the magnetic attraction being similar to that obtained with the arrangement of FIG. 1 when using the steel strips 22.

It is believed that the operation of the invention will be clear from the foregoing description. However, it is desired to point out, that after application of the magnetic strip 10 to the surface 12, the guide line formed by the upper edge 16 is visually inspected to check the appearance. Any necessary alignment may be readily made by merely adjusting portions of the plastic strip. If a straight line is desired, the metal strips 22 are then placed on the exposed surface 20 of the magnetic strip 10 to firmly hold the latter in place and the striping tool is moved along the guide formed by the upper edge 16 of the magnetic strip 10 to paint the desired stripe or stripes.

Should a curved stripe be desired, the arrangement of FIG. 3 is utilized. In this case, one of the narrow magnetic strips 24 is first applied to the surface and adjusted to obtain the proper contour. When the desired shape of this strip has been obtained, the second magnetic strip 26 is placed in edge-abutting relationship with the first strip to reinforce the latter and the steel strips 28 and 30 are then applied as shown in FIG. 3. With such an arrangement, the edge 32 of the strip 24 forms a rigid guide for the striping tool.

While a preferred form of the invention has been shown and described herein with considerable particularity, it will be understood by those skilled in the art that various modifications may be made without departing from the spirit of the invention. Reference will therefore be had to the appended claim for a definition of the invention.

What is claimed is:

1. A guide strip device for guiding a painting tool in the application of a painted stripe to a magnetizable metallic surface, comprising a plurality of elongated, unconnected flexible plastic strips having a plurality of magnetized particles embedded therein to cause said strips to form a coherent unit and to adhere to said surface, said unit of plastic strips having a rectangular cross section with one side surface of the unit engaged with the surface to be striped, the outer edges of said unit forming a guide for a painting tool, the individual strips of the unit being arranged in inner edge-abutting relationship to reinforce each other while said strips are curved to provide a curved guide for the striping tool and means for increasing the magnetic attraction between said unit and said surface comprising at least one relatively thin elongated strip of magnetizable metal engaging the side surface of the unit opposite to said one side surface throughout the length of said steel strips, said means overlying the adjacent abutting inner edges of said strips.

References Cited

UNITED STATES PATENTS

| | | | |
|---|---|---|---|
| 2,798,299 | 7/1957 | Cooper | 33—177 |
| 3,134,176 | 5/1964 | Hoyle | 33—177 |

OTHER REFERENCES

Article from Product Engineering, By A. R. Gardner, Jan. 9, 1961, pp. 65–68.

SAMUEL S. MATTHEWS, *Primary Examiner.*

U.S. Cl. X.R.

335—303